No. 874,571.  PATENTED DEC. 24, 1907.
H. B. CRAMPTON.
DEVICE FOR CUTTING FLAPS OF SWEAT BANDS.
APPLICATION FILED MAR. 12, 1907.
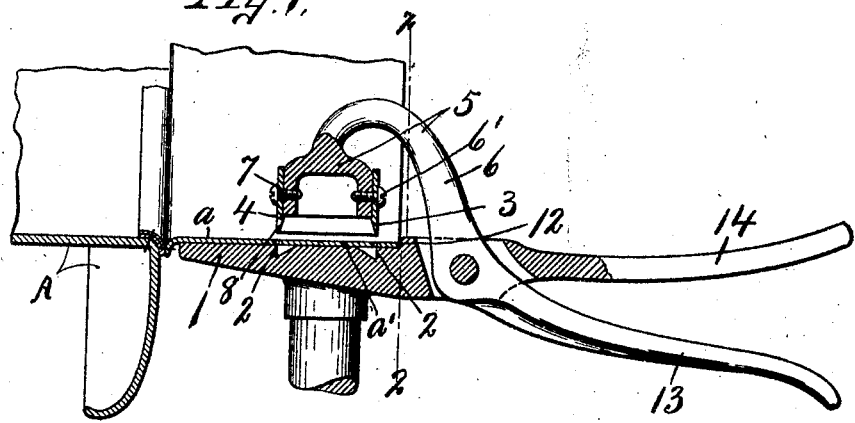
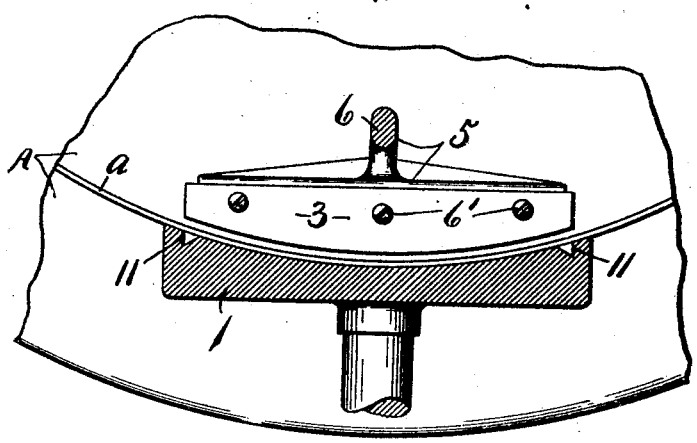
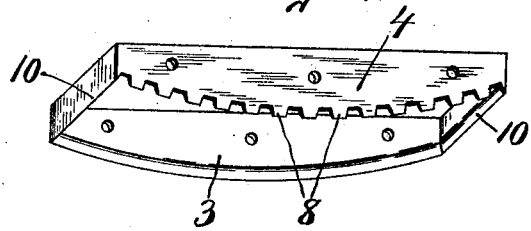
Witnesses.
Inventor.
H. B. Crampton
By
Howard P. Denison
Attorney.

UNITED STATES PATENT OFFICE.

HENRY B. CRAMPTON, OF SYRACUSE, NEW YORK.

DEVICE FOR CUTTING FLAPS OF SWEAT-BANDS.

No. 874,571.

Specification of Letters Patent.

Patented Dec. 24, 1907.

Application filed March 12, 1907. Serial No. 361,965.

*To all whom it may concern:*

Be it known that I, HENRY B. CRAMPTON, of Syracuse, in the county of Onondaga, in the State of New York, have invented new and useful Improvements in Devices for Cutting Flaps of Sweat-Bands, of which the following, taken in connection with the accompanying drawings, is a full, clear, and exact description.
This invention relates to a device for cutting flaps of sweat bands forming the subject matter of my pending application No. 361,964, filed March 12, 1907, the object of which is to form the sweat band with integral flaps adapted to be folded between the band and body of the hat to vary its size and to enable the hat to be more closely fitted to the head.

The object of my present invention is to provide simple, practical and efficient means for cutting these flaps in the sweat bands, such device being adapted to be used by retailers and for this purpose is made portable to be carried about the store from place to place as may be desired or it may be permanently attached to a suitable bench or table and used in one place.

Other more specific objects will be brought out in the following description.
In the drawings—Figure 1 is a transverse vertical sectional view of my sweat band cutter, shown in operative position to cut one of the flaps in said band. Fig. 2 is a sectional view taken on line 2—2, Fig. 1 and Fig. 3 is a perspective view of the detached cutters.

This cutter comprises essentially a bed —1— curved longitudinally to conform to the curvature of the sweat band as —a— of a hat —A—, said bed being provided with shearing edges or grooves —2— which coöperate with suitable cutters —3— and —4—, the latter being mounted upon and secured to a vertically movable frame —5—
which is adapted to be operated by any suitable mechanism as a lever —6—.

The cutter —3— is made in the form of a knife blade having its lower cutting edge curved to conform to the curvature of the upper face of the bed —1— and sweat band —a— which rests upon the bed.—1— in the act of cutting the flaps therein, said blade —3— being of the same length as the length of the flap which it is desired to cut in the band, and is secured by suitable fastening means as screws —6'— to the adjacent side of the frame —5—, the lower cutting edge of the blade —3— being continuous so as to cut through the leather or band —a— at all points throughout its length.

The blade —4— is secured by suitable fastening means as screws —7— to the outer or rear side of the frame —5— and is similar to the blade —3— except that its lower cutting edge is serrated to form a series of cutting teeth —8— spaced apart for the purpose of cutting through the sweat band at intervals along the folding line of the flap which may be designated by the reference letter —a'—. These cutting blades —3— and —4— are parallel and of substantially equal length and their lower cutting edges shear with the corresponding shearing edges —2— in the bed —1— when the frame —5— is moved downwardly by the lever —6—.

The ends of the flaps —a'— are cut from the main body —a— by end blades —10— which are secured to the opposite end of the frame —5— and, therefore, at the opposite ends of the blades —3— and —4— and shear with corresponding edges —11— in the bed —1—, the lower cutting edges of said end blades —10— being continuous so as to cut entirely through the leather at all points throughout their lengths from the blade —3— to the blade —4— transversely of the sweat band.

The distance between the blades —3— and —4— determines the transverse width of the flap and is usually about equal or slightly less than the distance from the perforating blade —4— to the junction of the sweat band with the rim of the hat. In this particular instance the cutter blade —3— is arranged to engage and cut the band a slight distance from its outer longitudinal edge and in order that the standard sweat bands may be cut uniform distances from the free edge I provide the bed —1— with a stop shoulder —12— against which the free edge of the band is adapted to be brought when resting on the bed —1— and ready for cutting the flap therein.

The frame —5— may be moved to and from the bed —1— by any desired means as the lever —6— which is pivoted at —7— to the bed in front of the shoulders —12— and is provided with a suitable hand piece —13— which together with an extension —14— on the bed —1— are adapted to be engaged by the hand, the arm —13— being rocked upwardly to force the arm downwardly into cutting position.

What I claim is:

1. A device for cutting flaps of sweat bands comprising two shearing elements, one of said elements being movable toward and from the other and provided with a lengthwise serrated cutting edge, and additional cutters projecting at substantially right angles from the ends of the serrated cutter.

2. A device for cutting flaps in sweat bands comprising a bed having lengthwise and transverse grooves therein, a cutter supporting head movable to and from the bed, and provided with a lengthwise serrated cutter entering one of the grooves, and transverse cutters entering the other groove.

In witness whereof I have hereunto set my hand this 6th day of March 1907.

HENRY B. CRAMPTON.

Witnesses:
H. E. CHASE,
C. M. McCORMACK.